June 18, 1935.  G. W. PECK  2,005,633
FARMING IMPLEMENT
Original Filed Feb. 8, 1933   3 Sheets—Sheet 1
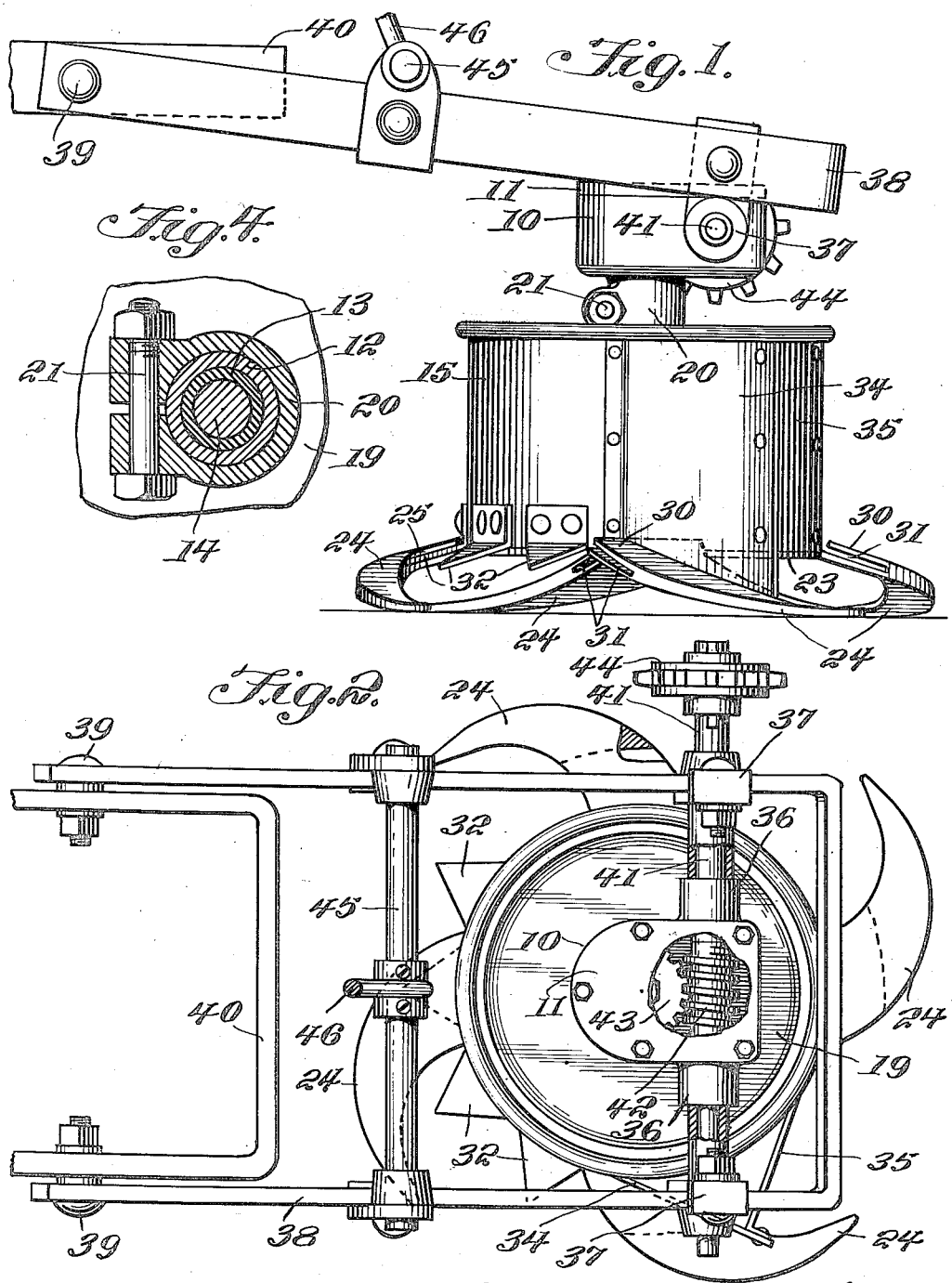

June 18, 1935.  G. W. PECK  2,005,633
FARMING IMPLEMENT
Original Filed Feb. 8, 1933  3 Sheets-Sheet 2
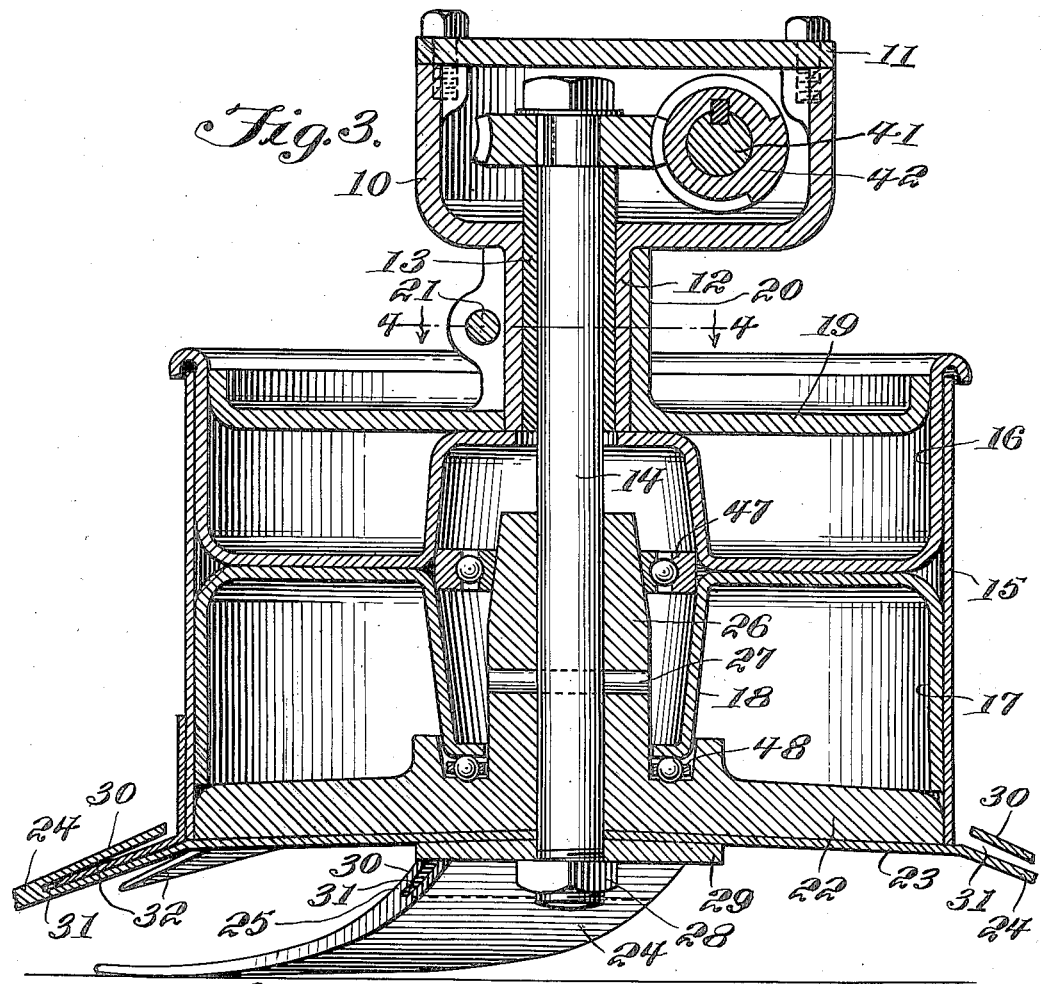
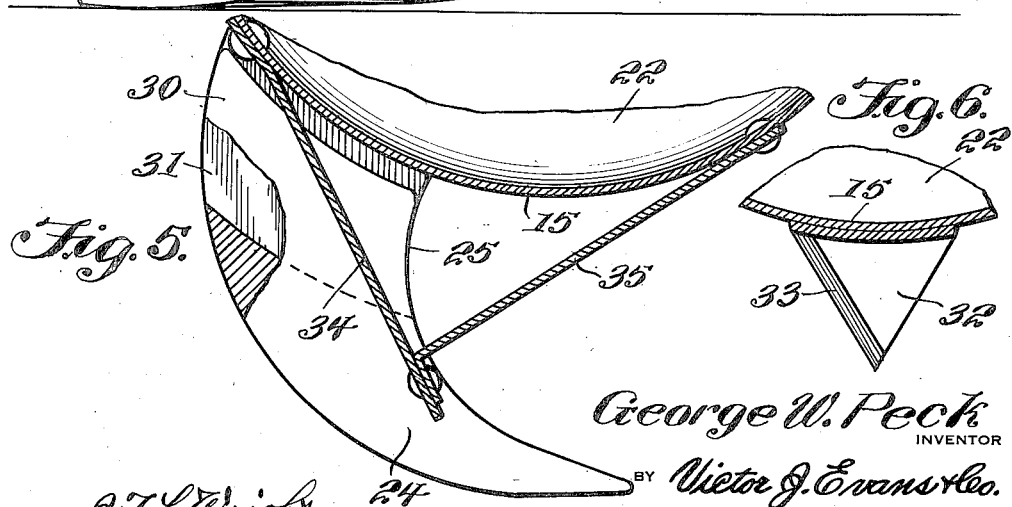
George W. Peck
INVENTOR
BY Victor J. Evans & Co.
ATTORNEY
WITNESS: J. T. L. Wright June 18, 1935.    G. W. PECK    2,005,633
FARMING IMPLEMENT
Original Filed Feb. 8, 1933   3 Sheets-Sheet 3

George W. Peck
INVENTOR

BY Victor J. Evans & Co.
ATTORNEY

WITNESS: J. T. L. Wright

Patented June 18, 1935

2,005,633

UNITED STATES PATENT OFFICE 2,005,633

FARMING IMPLEMENT

George W. Peck, Muscatine, Iowa

Refiled for abandoned application Serial No. 655,815, February 8, 1933. This application March 25, 1935, Serial No. 13,011

2 Claims. (Cl. 97—43)

The invention relates to a farming implement and more especially to a vine cutter.

This application is refiled for abandoned application Serial Number 655,815, filed February 8, 1933.

The primary object of the invention is the provision of an implement of this character, wherein under the action of a rotary cutter, vines in a field or growing from the ground can be successfully cut during the advancement of the implement, the latter being especially adaptable for the cutting of potato vines.

Another object of the invention is the provision of an implement of this character, wherein the rotary cutter cooperates with stationary cutting blades, these blades including the rotary cutter being of novel construction to assure the perfect operation of the machine and without retarding the advancement of such machine in the working of the same.

A further object of the invention is the provision of a machine of this character, wherein the same can be advanced either by man power, horse power or motor power and in the working of the same the rotary cutter will gather the vines and cut the same, as well as delivering the cut vines to the left side of the machine.

A still further object of the invention is the provision of a machine of this character, which is simple in construction, thoroughly reliable and efficient in its operation, readily and easily operated, strong, durable, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is a fragmentary elevation showing the rotary cutter constructed in accordance with the invention.

Figure 2 is a top plan view thereof, the same being partly in section or broken away at intervals for disclosing detailed adjuncts.

Figure 3 is an enlarged vertical sectional view through the rotary cutter.

Figure 4 is a sectional view on the line 4—4 of Figure 3 looking in the direction of the arrows.

Figure 5 is a fragmentary enlarged detail sectional view taken horizontally through the cutter.

Figure 6 is a similar view showing the stationary blade of the cutter.

Similar reference characters indicate corresponding parts throughout the several views in the drawings.

Figure 7:
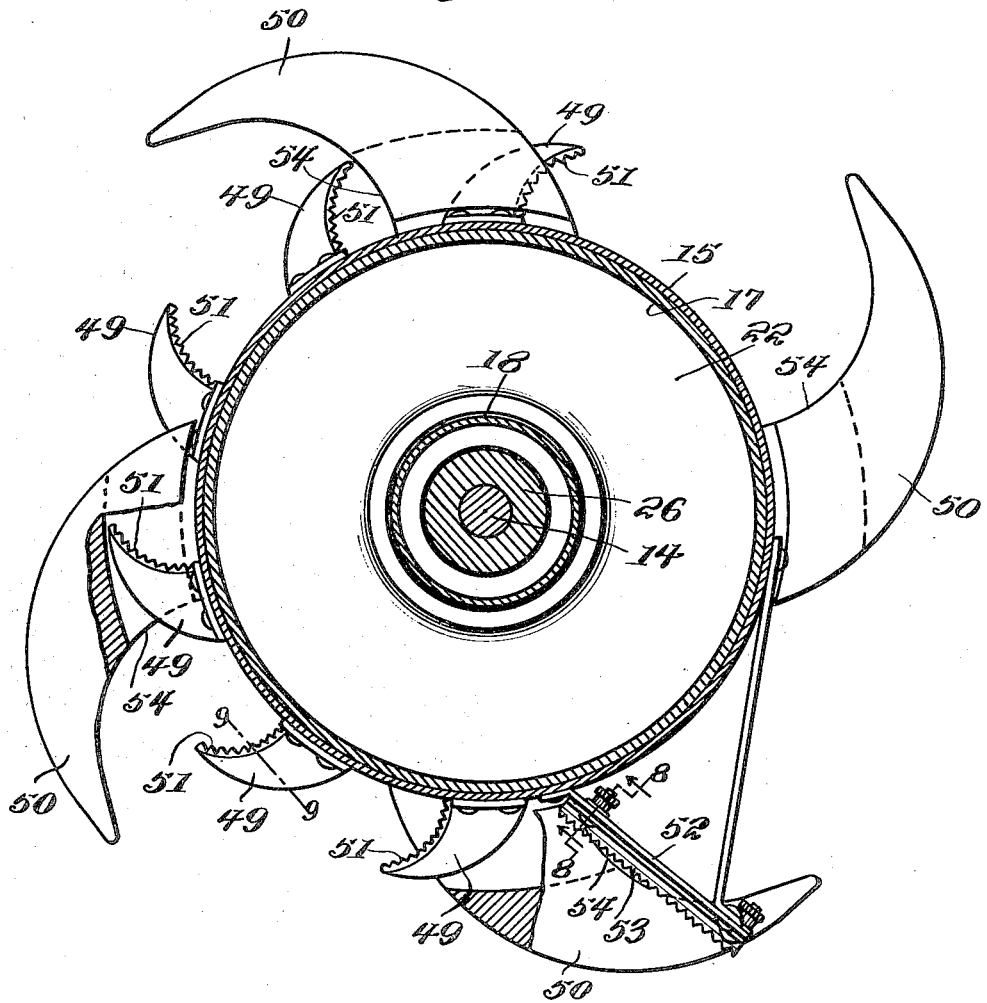
Figure 7 is a horizontal sectional view through the cutter showing a modified form thereof.

Referring to the drawings in detail, the rotary cutter comprises a gear casing 10 having a removable top cover plate 11 and a depending tubular extension 12 from the underside thereof. Within this extension 12 is a suitable bushing 13 for a vertical shaft 14 rotatably supported in said extension 12 of the casing 10.

Concentrically about the shaft 14 is a cylindrical stationary hollow head 15 in which are fitted the upper and lower sections 16 and 17 forming a hub 18 about said shaft 14, while closing the upper side of the head 15 is a circular crown 19 having a center longitudinally split clamping sleeve 20 embracing the extension 12. This sleeve 20 is fitted with a binding screw 21 so that the sleeve 20 can be firmly and securely made fast to the extension 12 by snugly embracing the same.

Fitted within the lower side of the head 15 is the circular casting 22 of a rotary cutting disk 23 having formed at equidistances thereon peripheral downwardly and outwardly curved sickle blade-shaped cutters 24, these having the cutting edge side 25. The casting 22 is formed with a central coupling stud 26 receiving the shaft 14 which is made fast therein by a cross pin 27. It is preferable to have the lower end of the shaft 14 carry a nut 28 working against a retaining member 29 to hold the cutting disk 23 removably joined to the casting 22 as will be apparent in Figure 3 of the drawings.

The cutters 24 at their heel portions are provided with overhangs 30 beneath which are guideways 31 for stationary substantially triangular-shaped cutting blades 32, these being carried by the head 15 at equidistances from each other. Each stationary blade 32 has the beveled cutting edge 33 confronting the cutting edge side 25 of each movable cutter 24.

Arranged at the left hand side of the head 17 is a tangentially arranged deflector wing 34 held rigid by a brace 35 connected thereto and to the head so that the severed material will be discharged to the left of the implement as should be obvious.

The gear casing 10 at opposite sides thereof has the laterally disposed housing extensions 36, while carried by the suspension frame 38 are hangers 37, the frame being pivoted at 39 to the wheeled frame 40 of the implement so that said frame 38 is mounted for vertical swinging movement. The housing 36 has arranged therein a driven shaft 41, the latter being fitted in the hangers 37 and this shaft is formed with a worm screw 42 meshing with a worm pinion or gear 43 fixed to the upper end of the shaft 14. The screw 42 and pinion or gear 43 are contained or confined within the housing 10. The driven shaft 41 has splined or keyed thereto a sprocket chain gear 44 which is removable therefrom for the substitution of a gear, if found desirable. Adapted to be trained over this sprocket gear 44 is a sprocket chain (not shown) geared with the traction wheels of the wheeled frame 40 so that on advancement of the implement, power will be imparted to the rotary cutting disk 23 for the operation of its cutters 24.

The frame 38 carries a cross mounting 45 for the attachment of a lift contrivance 46, whereby the said cutter can be raised or lowered with respect to the ground for the placement thereof in working position.

Within the hub 18 and about the coupling 26 is an anti-friction device 47 and likewise between the casting 22 and said hub 18 is an anti-friction device 48.

Figure 8:
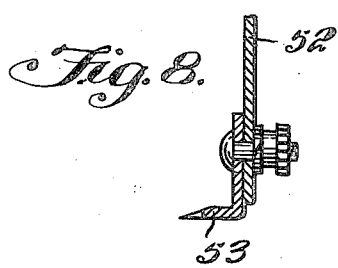
Figure 8 is a sectional view on the line 8—8 of Figure 7 looking in the direction of the arrows.
Figure 9:
Figure 9 is a sectional view on the line 9—9 of Figure 7.

In Figures 7, 8 and 9 of the drawings there is shown a slight modification of the invention, wherein the stationary blades 49 are of a shape alike to the movable cutters 50 but reversely disposed thereto and are formed with saw toothed cutting edges 51. The deflector plate 52 has removably mounted thereon a saw toothed edge cutter 53 adapted to coact with the cutting edges 54 of the movable cutters 50 which operate in a horizontal path, while the cutting edges 51 of the stationary blades 49 coact with the edges 53 of the movable cutters 50 as will be clearly apparent from Figure 7 of the drawings.

The movable members 24 and 50, each, in their formation, function as gathering elements to crowd the vines or the like and bring the same into the path of the stationary knives 32 and 49 respectively, to assure a perfect cutting action in the use of the implement.

What is claimed is:

1. In a farming implement of the character described, a stationary head, a rotary cutter movably supported at the lower side of the head and having spaced peripheral sickle-shaped cutters, stationary cutting blades on the head and intersecting the movable cutters, a support for said head, means for imparting rotation to the rotary cutter, and a deflector located on the head and tangentially disposed with respect thereto.

2. In a farming implement of the character described, a stationary head, a rotary cutter movably supported at the lower side of the head and having spaced peripheral sickle-shaped cutters, stationary cutting blades on the head and intersecting the movable cutters, a support for said head, means for imparting rotation to the rotary cutter, a deflector located on the head and tangentially disposed with respect thereto, and a cutter removably carried by said deflector for coaction with the rotary cutter.

GEORGE W. PECK.